United States Patent
Dalsgaard et al.

(10) Patent No.: US 7,421,272 B2
(45) Date of Patent: Sep. 2, 2008

(54) MBMS CELL RESELECTION TO PACKET CHANNEL

(75) Inventors: Lars Dalsgaard, Oulu (FI); Antti O. Kangas, Oulu (FI)

(73) Assignee: Nokia Corporation, Espoo (FI)

( * ) Notice: Subject to any disclaimer, the term of this patent is extended or adjusted under 35 U.S.C. 154(b) by 189 days.

(21) Appl. No.: 11/198,021

(22) Filed: Aug. 4, 2005

(65) Prior Publication Data

US 2006/0251019 A1 Nov. 9, 2006

Related U.S. Application Data

(60) Provisional application No. 60/666,530, filed on Mar. 29, 2005.

(51) Int. Cl.
*H04Q 7/20* (2006.01)
(52) U.S. Cl. .............. 455/438; 455/436; 455/437; 455/439; 455/440; 455/561; 455/450; 455/452.1; 455/452.2; 370/331; 370/335; 370/437
(58) Field of Classification Search ......... 455/436–444, 455/560–561, 450, 451, 452.1–2; 370/335, 370/342, 331–334, 431, 437
See application file for complete search history.

(56) References Cited

U.S. PATENT DOCUMENTS

| 2004/0202140 A1* | 10/2004 | Kim et al. ............... 370/335 |
| 2005/0141443 A1* | 6/2005 | Kim et al. ............... 370/312 |
| 2005/0195852 A1* | 9/2005 | Vayanos et al. ......... 370/437 |

* cited by examiner

*Primary Examiner*—Tuan A Tran

(57) ABSTRACT

A method and corresponding equipment by which a mobile station (wireless terminal) is able to undergo handover to another cell of a telecommunication system, and continue to receive a point-to-multicast transmission (e.g. MBMS packets) without a delay otherwise caused because of having to receive a channel (e.g. PBCCH in case of MBMS) conveying system information in the new cell and so causing the mobile station to first obtain the bearer information/location for the system information channel. The method is based on the mobile station using information in a neighboring cell information message (e.g. the MNCI message in case of an MBMS session) or other message (possibly specially defined) before changing to the new cell to determine the bearer information for the system information channel in the new cell (and also obtaining from the neighboring cell information the bearer information for receiving the point-to-multipoint transmission in the new cell).

27 Claims, 2 Drawing Sheets

MBMS CELL RESELECTION TO PACKET CHANNEL

CROSS REFERENCE To RELATED APPLICATION

Reference is made to and priority claimed from U.S. provisional application Ser. No. 60/666,530, filed Mar. 29, 2005.

BACKGROUND OF THE INVENTION

1. Technical Field

The invention relates to GSM/GPRS cellular mobile station mobility, and more specifically to enhancements to cell change procedure during MBMS.

2. Discussion of Related Art

MBMS (Multimedia Broadcast/Multicast Service) is a unidirectional point to multipoint (p-t-m) bearer service in which data is transmitted from a single source entity to multiple recipients. These services are typically in the form of streaming video and audio.

Cell change of a mobile station during an MBMS session (with a serving base station/Node B of a radio access network of a wireless communication system) sometimes takes longer than is desirable, and of particular concern is when packet channels are supported by the target cell (i.e. the cell to which the mobile station is changing to for continued connection to the MBMS source). Due to the nature of the MBMS (in that it provides e.g. streaming video and audio) it is not desirable to have interruptions in the reception of data by the mobile station prior to or after a cell change. When the mobile station needs to perform cell reselection and the target cell supports packet channels, such as PBCCH (Packet Broadcast Control CHannel) or PCCCH (Packet Common Control CHannel), a GPRS attached mobile station camps on the packet channels. The PBCCH, if allocated, broadcasts packet data specific PSI (Packet System Information), but if PBCCH is not allocated, the packet data specific system information is broadcast on BCCH (Broadcast Control Channel. The PCCCH comprises logical channels, or subchannels, for GPRS common control signalling. These subchannels include: PRACH (Packet Random Access Channel), PPCH (Packet Paging Channel), PAGCH (Packet Access Grant Channel) and PNCH (Packet Notification Channel).

In order to camp on PCCCH the mobile station first needs to read PSI from PBCCH. In order to be able to read PSI the mobile station needs to know the location of the PBCCH, i.e. where it physically is located (in the radiofrequency spectrum), i.e. what its frequency is, and how it is scheduled. Currently a mobile station retrieves or receives the PBCCH description information either before or after a cell change. This can be done either by reading the information concerning the PBCCH allocation from a neighbor cell (prior to cell change) or by receiving the information on PBCCH from the serving cell.

A mobile station during data transfer may obtain the PBCCH allocation information prior to a cell change in at least three ways. A first way is for the mobile station to autonomously read the System Information (SI) of the target cell in order to receive the PBCCH description prior to the cell change. This is done independently of the data transfer, causing interrupts in the data transfer.

A second way is for the mobile station to apply Packet Cell Change Notification (CCN) if the network supports the Network Assisted Cell Change (NACC) procedure, and thereby receive the PBCCH description from the network prior to cell change. Note that NACC, and therefore also CCN, is currently only applicable in packet transfer mode, which does not include MBMS broadcast/multicast receive mode.

A third way is for the mobile station to receive the neighbor PBCCH allocation description in a PBCCH location information structure broadcast in Packet System Information (PSI) type 3 and type 3 bis, assuming the mobile station is camped on the packet channels. The PBCCH location information structure does not support broadcast of all types of PBCCH allocation descriptions; it only supports delivering the PBCCH allocation of a non-hopping PBCCH allocated on BCCH.

Non-hopping and hopping in respect to a channel have to do with the two forms of code division multiple access (CDMA) transmission, namely frequency hopping CDMA (FH-CDMA) and direct sequence CDMA (DS-CDMA). In an FH-CDMA system, a transmitter, in providing a communication channel, "hops" between available frequencies according to a specified algorithm, which can be either random or preplanned. The transmitter operates in synchronization with a receiver, which remains tuned to the same center frequency as the transmitter. A short burst of data is transmitted on a narrowband. Then, the transmitter tunes to another frequency and transmits again. The receiver thus is capable of hopping its frequency over a given bandwidth several times a second, transmitting on one frequency for a certain period of time, then hopping to another frequency and transmitting again. In DS-CDMA, data is chopped into small pieces and spread across a frequency domain.

If a mobile station attempting cell change does not retrieve or receive all of the PBCCH location information before the cell change, the mobile station first needs to camp on BCCH before camping on PBCCH. This is necessary in order to receive the PBCCH description information from System Information type 13 (SI13) broadcast on BCCH. This may take several seconds (up to approximately 7 seconds) due to scheduling rules concerning SI13. Afterward, the mobile station can switch to the PBCCH.

The main problem with retrieving the PBCCH description after a cell change is that the network needs to coordinate (if possible) the scheduling of the BCCH, the PBCCH, and the MBMS session. Such coordination is needed for the mobile station to be able to receive the BCCH, PBCCH and MBMS data simultaneously. As the mobile station cannot start to receive PBCCH data before having the PBCCH description, it is necessary also to ensure that the mobile station can receive BCCH data while receiving the MBMS data. This reduces the MBMS transmission capacity in the network because it reduces the maximum number of time slots possibly used for MBMS data transmission. More details are provided in 3GPP TS 43.246 MBMS Stage 2 specification Annex B. (Note that the above examples are used for illustrating the problem and may not cover all possible scenarios.)

Thus, the prior art currently does not make it possible to perform cell change during an MBMS reception to a cell supporting packet channels, without possible severe interruptions in receiving the MBMS transmission or by limiting the MBMS transmission capacity in cells supporting packet channels.

Therefore what is needed is a procedure for cell change that optimises and shortens the cell reselection time for a GPRS-capable mobile station engaged in an MBMS session, a procedure that is, ideally, of use in any GPRS cell change, and even to other wireless systems using cell reselection.

DISCLOSURE OF INVENTION

The invention addresses the above-illustrated problems. It aims at improving cell reselection during an MBMS session to another cell supporting packet channels, and more specifically, for a mobile station in broadcast/multicast receive mode, and in particular, it aims at reducing any possible delay/gap and/or interruptions in MBMS reception after cell reselection. The invention also aims at removing the possible constraints in MBMS scheduling due to support of packet channels in a cell. The invention may be applicable not only to cell changes during an MBMS session, but to cell changes in general.

In a first aspect of the invention, a method is provided, comprising: a step in which, prior to a cell change from a current cell to a new cell in a cellular communication system, a mobile station receives a signal on a control channel conveying a message including neighboring cell information indicating bearer information for receiving a point-to-multipoint data channel (such as a data channel conveying a MBMS transmission) in the new cell, and also receives a signal indicating bearer information for receiving a system information channel (such as PBCCH) in the new cell; and a step in which after the cell change the mobile station begins receiving both the system information channel and also the point-to-multipoint data channel without obtaining bearer information for either after the cell change.

In accord with the first aspect of the invention, the system information channel may be coordinated with the point-to-multipoint data channel, and so after the cell change the mobile station receives the data on the point-to-multipoint data channel immediately and without interruption.

Also in accord with the first aspect of the invention, the bearer information for receiving the system information channel in the new cell may be included in the message including the neighboring cell information, i.e. the two signals received by the mobile station may convey different parts of the same message. Alternatively, the bearer information for receiving the system information channel in the new cell may be included in a different message than the message including the neighboring cell information.

Also in accord with the first aspect of the invention, the neighboring cell information may be provided as a broadcast signal.

Also in accord with the first aspect of the invention, the neighboring cell information may be provided as a point-to-point signal from a sender to the mobile station.

Also in accord with the first aspect of the invention, the system information channel may be either a hopping channel or a non-hopping channel.

Also in accord with the first aspect of the invention, the point-to-multipoint data channel may be a packet data channel, and the system information channel may be a packet broadcast control channel, and the neighboring cell information may include the bearer information for the system information channel as a description structure message element.

Also in accord with the first aspect of the invention, the point-to-multipoint data channel may be a packet data channel, and the system information channel may be a packet broadcast control channel, and the neighboring cell information may include the bearer information for the system information channel as a system information location structure message element.

Also in accord with the first aspect of the invention, the point-to-multipoint data channel may be a packet data channel, and the system information channel may be a packet broadcast control channel, and the neighboring cell information may be communicated over a packet associated control channel.

Still also in accord with the first aspect of the invention, the point-to-multipoint data channel may be a packet data channel, and the system information channel may be a packet broadcast control channel, and the neighboring cell information may be received over a broadcast channel.

In a second aspect of the invention, a computer program product is provided comprising a computer readable storage structure embodying computer program code thereon for execution by a computer processor, wherein said computer program code comprises instructions for performing the steps of a method according to the first aspect of the invention.

In a third aspect of the invention, a device is provided, comprising means for performing the steps of a method according to the first aspect of the invention.

In a fourth aspect of the invention, a mobile station is provided, including a device according to the third aspect of the invention.

In a fifth aspect of the invention, a system is provided, comprising a mobile station according to the fourth aspect of the invention, and also a radio access network including a transceiver for wirelessly communicatively coupling to the mobile station, and for providing the signal on the control channel conveying a message including the neighboring cell information indicating bearer information for receiving the point-to-multipoint data channel in the new cell, and also for providing the signal indicating the bearer information for receiving the system information channel in the new cell.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1:
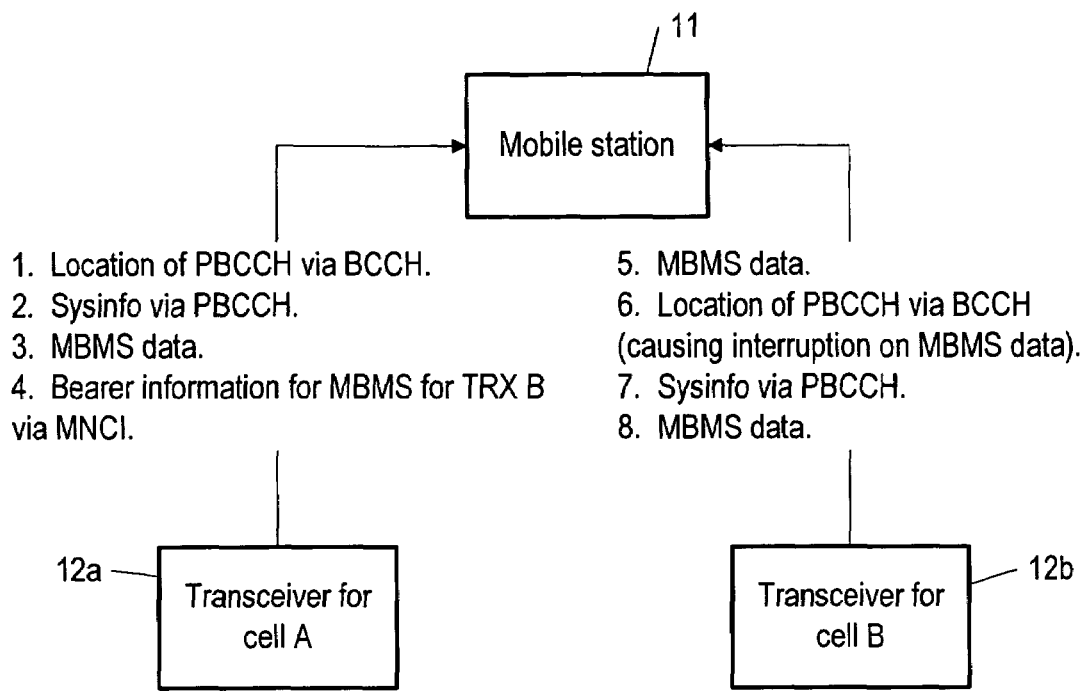
FIG. 1 is a block diagram/flow diagram illustrating a mobile station undergoing a cell change process during an MBMS transmission, according to the prior art.
Figure 2:
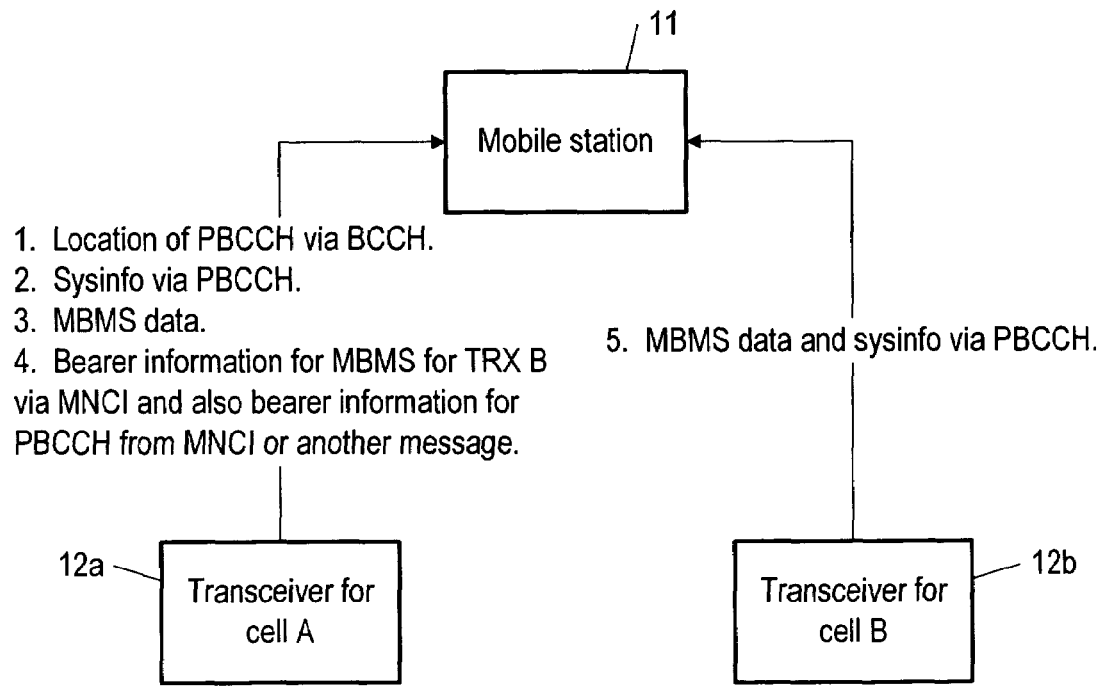
FIG. 2 is a block diagram/flow diagram illustrating a mobile station undergoing a cell change process during an MBMS transmission, according to the invention.

Referring now to FIG. 1 and FIG. 2: FIG. 2 shows a mobile station 11 undergoing a cell change process during a (point-to-multipoint) MBMS transmission (conveying e.g. real-time audio and/or video) according to the invention, in contrast with operation of a mobile station in the same situation but operating according to the prior art as shown in FIG. 1. In both cases the mobile station begins receiving an MBMS transmission in the cell served by transceiver (TRX) A 12a, and also receives system information from PBCCH in the cell, and the reception of the two is coordinated so that a delay in receiving one causes a delay in receiving the other.

Now in the prior art as shown in FIG. 1, prior to a cell change to the cell served by TRX B 12b, the mobile station 11 obtains from MBMS neighboring cell information (MNCI) the bearer information for receiving MBMS in the cell served by TRX B, but has no way of obtaining the bearer information for receiving PBCCH, which it must receive simultaneously with MBMS (i.e. reception on the two channels—PBCCH and the channel carrying MBMS—is coordinated). So after changing to the cell served by TRX B 12b, the mobile station must obtain the bearer information/location of PBCCH from BCCH, which causes an interruption in receiving MBMS.

In contrast, according to the invention as shown in FIG. 2, prior to cell change the mobile station 11 again obtains the bearer information for MBMS from MNCI, but now also obtains the bearer information/location of PBCCH, either from the MNCI or from another message, possibly one specially designed for the purpose. Thus, after cell change, the mobile station can continue, without interruption, receiving the channel conveying MBMS and also, as required, PBCCH (as two coordinated channels).

Figure 3:
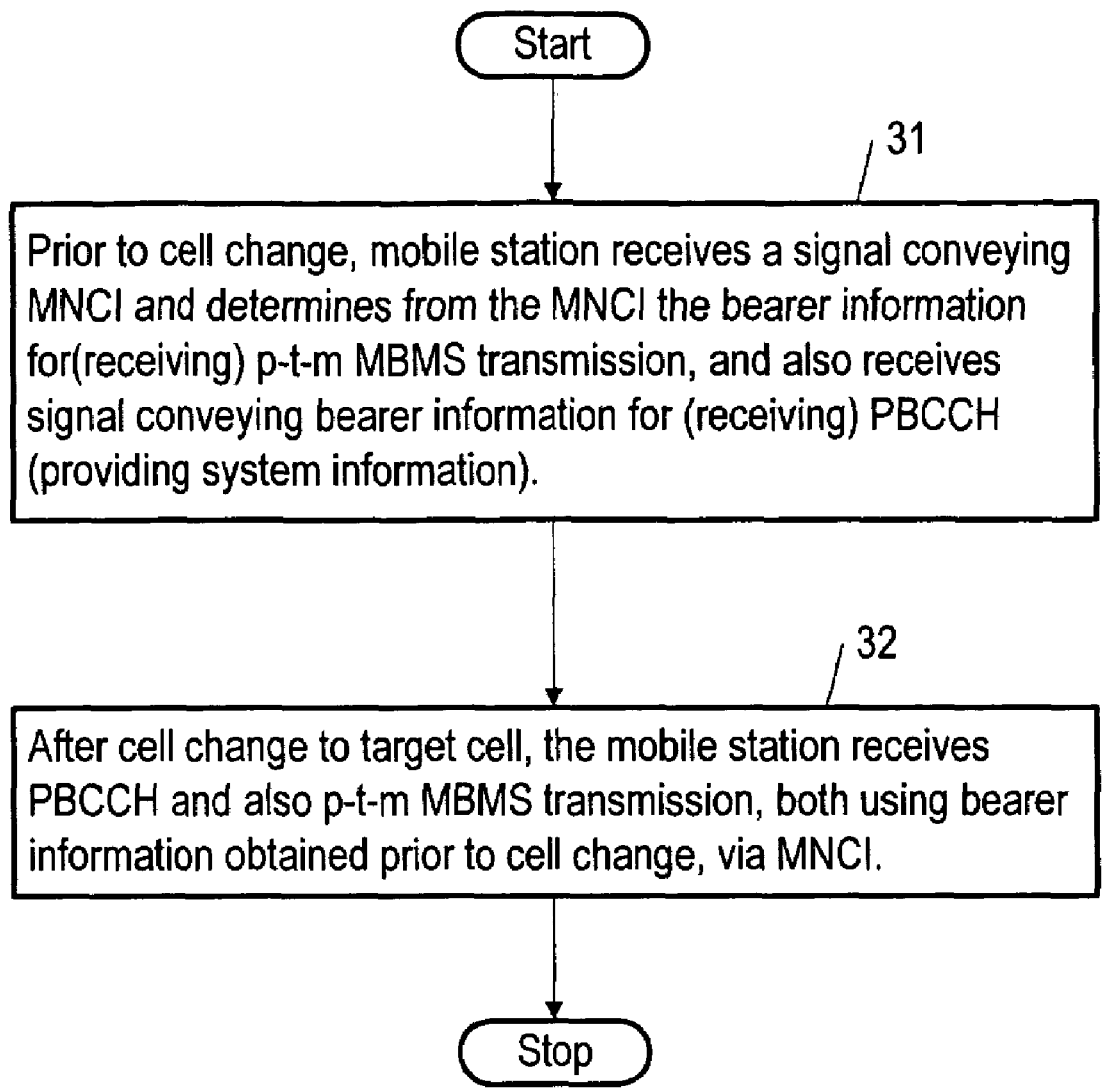
FIG. 3 is a flow chart illustrating operation of a mobile station undergoing a cell change during an MBMS transmission, according to the invention.

Referring now to FIG. 3, a mobile station according to the invention, before undergoing a cell change during an MBMS transmission, in a first step 31, receives a signal bearing MNCI and determines from the MNCI the bearer information needed to receive the MBMS in the new cell, and also receives a signal conveying the bearer information/location (information indicating the actual frequency) of PBCCH, i.e. the information needed to receive PBCCH. (The bearer information for PBCCH may be provided via MNCI or another message. In other words, the signal providing MNCI may be a signal providing part of the same message as the signal providing the bearer information for PBCCH.) In a next step 32, after the cell change to the new (target) cell, the mobile station is thus able to immediately, without interruption, receive both the channel conveying MBMS and PBCCH, as coordinated channels.

It is important to understand that in MBMS a central concept is to coordinate the radio resources between the control channel (either BCCH or PBCCH) and the MBMS radio bearer(s) such that it is physically possible for the mobile station to receive both the MBMS and the control channel without interruption. Now if there is no PBCCH allocated in a cell, the MBMS radio bearer(s) is coordinated with the BCCH. However, if the cell has PBCCH allocated, the MBMS radio bearer(s) is coordinated with the PBCCH. Therefore, in the case that PBCCH is allocated in a cell, after changing to the cell the mobile station (if it has no prior knowledge of the location of the PBCCH), first has to receive the BCCH in order to determine the location of the PBCCH, and must do so at the same time as it is receiving the MBMS data. Since the BCCH and the MBMS bearer(s) are not coordinated, there will be, unavoidably, gaps in the reception of the MBMS data due to the reception of BCCH.

Thus, in the prior art, when a mobile station changes from cell A to cell B having PBCCH allocated, the following occurs:

1. The mobile station begins receiving and continues to receive MBMS data in cell A.
2. The mobile station receives the location of the MBMS bearer of cell B from MNCI.
3. The mobile station changes from cell A to cell B.
4. The mobile station (because of having obtained the bearer information for MBMS from MNCI) can start immediately receiving MBMS data in cell B.
5. The mobile station receives BCCH data in order to find the location of the PBCCH, and in so doing causes interruptions in receiving the MBMS data.
6. After receiving the PBCCH location information (from BCCH), the mobile station starts receiving PBCCH data.

In contrast, according to the invention in an embodiment in which the PBCCH bearer information is provided via MNCI, the following occurs:

1. The mobile station begins receiving and continues to receive MBMS data in cell A.
2. The mobile station receives the location of MBMS bearer and also the location of PBCCH of cell B from MNCI.
3. The mobile station changes from cell A to cell B.
4. The mobile station starts immediately receiving MBMS data in cell B.
5. The mobile station also starts immediately receiving PBCCH data, and so (because PBCCH is coordinated with MBMS) no interruptions occur in the MBMS reception.

Note that if the mobile station has GPRS data or signalling (GPRS mobility management meaning Routing Area Update or Cell Update) to be transmitted at this point, the transmission can be started without the extra delay caused by receiving BCCH (as would be required by the prior art).

Thus, according to the invention, a cellular communication network is configured to deliver to a mobile station the PBCCH allocation information of a targeted neighbor cell prior to a cell change. The PBCCH allocation information may be provided via the PBCCH description structure, structure 2, or SI13 PBCCH location structure or similar information for a (targeted) neighbor cell reselection candidate to the mobile station prior to the cell change. The PBCCH allocation information may be delivered from the network to the mobile station either as general broadcast information for all mobiles and for all neighbors (having packet channels allocated) or it may be delivered from the network to a specifically addressed mobile station (point-to-point).

The information to be delivered to the mobile station is, for the general case, information that enables the mobile station to determine the location of the PBCCH of a neighbor cell regardless of whether the PBCCH is allocated as a hopping or non-hopping PBCCH.

Advantageously, according to the invention, the following information may be delivered to a mobile station: non-hopping parameters (see e.g. 3GPP 45.002 section 6); hopping parameters (see again e.g. 3GPP 45.002 section 6); or an indication that 'same as previous' allocation is used.

Advantageously also, the PBCCH allocation information is included in one or another of the following information elements already defined in 3GPP TS 44.60: PBCCH Description structure (section 11.2.25a Packet System Information 14); PBCCH Description structure 2 (section 11.2.20, Packet System Information Type 3); and SI13 PBCCH Location structure (section 11.2.25, Packet System Information 13). These structures are as follows:

1) PBCCH Description Structure:

```
< PBCCH Description : < PBCCH Description struct >
  < PBCCH Description struct > ::=
    < Pb : bit (4) >
      < TSC : bit (3) >
      < TN : bit (3) >
      { 0    -- default to BCCH carrier
      | 10   < ARFCN : bit (10) >
      | 11   < MAIO : bit (6) > };
```

2) PBCCH Description Structure 2:

```
< PBCCH Description : < PBCCH Description struct 2 >
  < PSI1_REPEAT_PERIOD : bit (4) >
  < Pb : bit (4) >
  < TN : bit (3) >
  < PBCCH Frequency Description : < Frequency Parameters IE >> ;
```

3) SI13 PBCCH Location Structure:

```
< SI13 PBCCH Location : < SI13 PBCCH Location struct >
        < SI13 PBCCH Location struct > ::=
    { 0    < SI13_LOCATION : bit (1) >
    | 1    < PBCCH_LOCATION : bit (2) >
           < PSI1_REPEAT_PERIOD : bit (4) > } ;
```

(ARFCN, referred to in the PBCCH description structure, is the Absolute Radio Frequency Carrier Number.) The messages may be used as indicated, or in a modified form.

As for the PBCCH description structure indicated here, it is not directly suitable but may be used if redefined. The reason for this is that the information in the structure refers to the current serving cell SI/PSI and therefore introduces some additional complexity for use in connection with neighbor cells. It may be used though in a situation where the mobile station may then assume that the neighbor cell parameters (referred to by above PBCCH description structure) are the same in the neighbor cell as in the current serving cell. This will also include the usage of the GPRS Mobile Allocation (see 44.018 section 10.5.2.37b) to be used together with the PBCCH Description structure.

As for the PBCCH Description structure 2 indicated here, this is a more suitable choice (if not defining a new message) as it is self-contained and does not refer to any other information elements. This means that the hopping channel can be described by the PBCCH Description structure 2 alone.

As for the SI13 PBCCH Location structure as indicated here, this can be used in a slightly modified way in order to indicate whether a neighbor cell has the PBCCH allocation as a former indicated cell. This can be done by substituting the SI13_Location bit with a bit indicating "Same As Previous Cell," as explained in more detail in the example below.

The invention encompasses not only using the above messages or variations of same, but also an entirely new message defined specifically for the purpose of delivering the PBCCH allocation information to one or more mobile stations.

More specifically, the invention encompasses the following ways the network may provide or deliver to the mobile station the necessary PBCCH allocation information prior to cell change:

1) Deliver the information to the mobile station using an improved (e.g. augmented) version of the existing MBMS Neighboring Cell Information (MNCI) message as specified in 3GPP TS 44.60.
2) Distribute the PBCCH allocation as distribution messages using e.g. a modified version of the 3GPP 44.60 PSI14 message or a similar newly defined message.
3) Add the PBCCH allocation information to the PCCO (Packet Cell Change Order) or a similar newly defined message (3GPP TS 44.60).
4) Add the PBCCH allocation information to Packet Cell Change Continue (PCCC) message (3GPP TS 44.60).
5) Distribute the PBCCH allocation System Information type 2n (SI2n)
6) Provide the PBCCH allocation information in a new message defined for just that purpose. (See 3.)

The above-described ways are provided as examples of how the network may provide or deliver to the mobile station the necessary PBCCH allocation information prior to cell change. These examples can easily be adapted to and extended to cover GSM/GPRS or mobility in general, either directly or with modifications. In the first of the above examples, only a very minimum amount of information need be added to the MNCI message based on the assumptions made in MBMS. This example of an implementation is therefore especially useful in case of an MBMS transmission.

The invention in general is advantageously implemented by having the network include the necessary PBCCH allocation information ('PBCCH Description' structure, 'PBCCH Description' structure 2 or 'SI13 PBCCH Location' structure) in a message sent to the mobile station during the MBMS reception.

For a non-hopping case (i.e. at least where the PBCCH is non-hopping), the mobile station needs the following information: BCCH Location (timeslot number to be used); and PSI1 Repeat Period. For a hopping case (where at least the PBCCH is hopping) the mobile station needs the following information: list of frequencies to be used in the hopping sequence (various coding possibilities exist); training sequence code; timeslot number; Mobile Allocation Index Offset (MAIO); and Hopping Sequence Number (HSN).

The invention also encompasses a general way of using existing defined information elements (as described below) as a way of delivering the information to the mobile station. It is of course also possible to define a new structure for the same purpose, maybe one more optimized in its coding than current structures.

The following describes an especially advantageous implementation in the MBMS case. In case of MBMS it is possible to re-use the MNCI message and add to this message information elements by which the network is able to inform a mobile station that a neighbor has PBCCH allocated, and to also inform the mobile station about the PBCCH allocation. The PBCCH can be allocated as a hopping PBCCH or non-hopping PBCCH.

In case of a non-hopping PBCCH, it is only necessary to inform the mobile station that PBCCH is allocated, and on which timeslot number (TN) on BCCH the PBCCH is allocated. This can be done using the 2-bit information element: PBCCH_LOCATION (described in SI13_PBCCH_Location structure above).

In case of a hopping PBCCH, more information is needed, but by re-use of existing information in the MNCI message it is possible to reduce the amount of information needed. By re-use of the frequency parameters available in the MNCI message for the list of PDCH's for a given cell, it is possible to reduce the amount of missing information so as to include only that PBCCH is present in the cell, the TN of the PBCCH, and whether the rest of the hopping parameters are the same as for the PDCH. The information to be added could be coded as in Table 1.

TABLE 1

```
< MBMS Neighboring Cell Information message content > ::=
    < PAGE_MODE : bit (2) >
    { 1 < NEIGHBOR_CELL_INDEX : bit (7) >
        { 0 | 1 < BSIC : bit (6) > }
        {1
```

TABLE 1-continued

```
    < Length of MBMS Bearer Identity : bit (3) >
    < MBMS Bearer Identity : bit (val (Length of MBMS Bearer Identity)) >
    < Absence cause: bit (2) >
  } ** 0 -- End of list of MBMS bearers for which no p-t-m channel description is given in the neighbor cell
  {1
    < Frequency Parameters : < Frequency Parameters IE > >
    < DOWNLINK_TIMESLOT_ALLOCATION : bit (8) > -- default value
    { 1
      < Length of Serving MBMS Bearer Identity : bit (3) >
      < Serving MBMS Bearer Identity : bit (val (Length of Serving MBMS Bearer Identity)) >
      < Length of Neighbor MBMS Bearer Identity : bit (3) >
      < Neighbor MBMS Bearer Identity : bit (val (Length of Neighbor MBMS Bearer Identity)) >
      { 0 | 1 < EGPRS Window Size : < EGPRS Window Size IE >> }
      { 0 | 1 < DOWNLINK_TIMESLOT_ALLOCATION : bit (8) >} -- specific value
      { 0 | 1 < TIMESLOT_ALLOCATION_UPLINK_FEEDBACK_CHANNEL : bit (3) >      }
      { 0 | 1 < MBMS Radio Bearer Starting Time : < bit (16) > > }
    } ** 0 -- End of list of MBMS bearer identifiers sharing the same PDCH (frequency parameters)
  } ** 0 -- End of list of PDCHs for this cell
** BEGIN ADDED PART
    { 0                 -- PBCCH information not present
    | 1                 -- PBCCH information
    < Pb : bit (4) >
    < TSC : bit (3) >
    < TN : bit (3) >
    { 00                -- non-hopping PBCCH on BCCH carrier
    | 01 < ARFCN : bit (10) >        -- non-hopping PBCCH
    | 1          -- hopping PBCCH, frequency parameters from an MBMS bearer description for this cell
      < Length of Neighbor MBMS Bearer Identity : bit (3) >
      < Neighbor MBMS Bearer Identity : bit (val (Length of Neighbor MBMS Bearer Identity)) >
          }
    }
** END ADDED PART
  } ** 0 -- End of list of neighboring cells
  < padding bits >
! < Distribution part error : bit (*) = < no string > > ;
```

The added part (indicated as such by "BEGIN ADDED PART" and "END ADDED PART") is the part indicating PBCCH presence and its possible allocation. (BSIC is the Base Station Identification Code.)

Another means of implementing the invention, including solutions for both MBMS and for GSM/GPRS mobility in general, could be coded as in Table 2.

TABLE 2

```
< MBMS Neighboring Cell Information message content > ::=
  < PAGE_MODE : bit (2) >
  { 1 < NEIGHBOR_CELL_INDEX : bit (7) >
    { 0 | 1 < BSIC : bit (6) > }
    {1
      < Length of MBMS Bearer Identity : bit (3) >
      < MBMS Bearer Identity : bit (val (Length of MBMS Bearer Identity)) >
      < Absence cause: bit (2) >
    } ** 0 -- End of list of MBMS bearers for which no p-t-m channel description is given in the neighbor cell
    {1
      < Frequency Parameters : < Frequency Parameters IE > >
      < DOWNLINK_TIMESLOT_ALLOCATION : bit (8) > -- default value
      { 1
        < Length of Serving MBMS Bearer Identity : bit (3) >
        < Serving MBMS Bearer Identity : bit (val (Length of Serving MBMS Bearer Identity)) >
        < Length of Neighbor MBMS Bearer Identity : bit (3) >
        < Neighbor MBMS Bearer Identity : bit (val (Length of Neighbor MBMS Bearer Identity)) >
        { 0 | 1 < EGPRS Window Size : < EGPRS Window Size IE >> }
        { 0 | 1 < DOWNLINK_TIMESLOT_ALLOCATION : bit (8) >} -- specific value
        { 0 | 1 < TIMESLOT_ALLOCATION_UPLINK_FEEDBACK_CHANNEL : bit (3) >      }
        { 0 | 1 < MBMS Radio Bearer Starting Time : < bit (16) > > }
      } ** 0  -- End of list of MBMS bearer identifiers sharing the same PDCH (frequency parameters)
      { 1   -- Packet channel description available for neighbor cell
        { 0
          < SI13 PBCCH Location 1 : < SI13 PBCCH Location struct 1 >
        | 1
          { 0
            < PBCCH Description : < PBCCH Description struct >
          | 1
            < PBCCH Description : < PBCCH Description struct 2 > }
      } ** 0 -- End of list of Packet channel description for this cell
```

TABLE 2-continued

```
        } ** 0 -- No Packet channel description for this cell
      } ** 0 -- End of list of PDCHs for this cell
    } ** 0 -- End of list of neighboring cells
    < padding bits >
! < Distribution part error : bit (*) = < no string > > ;
```

The SI13 PBCCH location structure referred to in Table 2 is:

```
< SI13 PBCCH Location 1 : < SI13 PBCCH Location struct 1 >
< SI13 PBCCH Location struct 1 > ::=
    { 0   -- same PBCCH Allocation as former cell
    | 1    < PBCCH_LOCATION : bit (2) >
           < PSI1_REPEAT_PERIOD : bit (4) > } ;
```

Also in Table 2, both the PBCCH Description structure and the PBCCH Description structure 2 are as indicated earlier. If the PBCCH Description structure is used, some additional text is needed indicating that the structure refers to a parameter received in the current serving cell. If the PBCCH Description structure 2 is used, it should use the Direct Encoding 2 style (see 3GPP TS 44.60 section 11.2.25a).

It should be noted that the above coding (which is offered for illustration purposes) is offered as illustrative only, and might not be correct in all details; also the coding might be refined compared to the above so as to reduce the number of options or other means for presenting the same information.

Adding the PBCCH allocation information in the MNCI message as above makes it possible for the network to distribute the information to all mobile stations receiving the message. Also it ensures that the PBCCH allocation is only sent for neighbors that are of importance for the possible ongoing MBMS session in the cell.

Allowing for the network to distribute the PBCCH allocation as a distribution message possibly to be sent on the Packet Associated Control Channel (PACCH) during MBMS can be done either by redefining the use of PSI14 or defining a new message for the purpose. (PACCH conveys signalling information related to a given GPRS mobile, such as acknowledgements and power control information, and also carries resource assignment and reassignment messages.) The redefinition of PSI14 for this purpose is not easy because the message is designed for providing information concerning the current serving cell and not a neighbor cell(s).

Thus, the invention also encompasses a new message. The purpose of the new message would be to make it possible for the network to send in a distribution message the PBCCH allocation information for neighbors, which may be used by the mobile station for reselection. The information elements could be those listed above. The way to link this information to the neighbor identities known by the mobile station is by either using ARFCN and BSIC identification or linking them to the neighbor list used for reselection by the mobile station. This list is known both by the mobile station and by the network. The message could be coded as in Table 3.

TABLE 3 nPSIx information elements

```
< PSI14 message content > ::=
    < nPSIx INDEX : bit (4) >
        < nPSIx COUNT : bit (4) >
        < GSM Neighbor Cell PBCCH Allocation parameters : { 1 <GSM
```

TABLE 3-continued nPSIx information elements

```
Neighbor Cell PBCCH Allocation params struct > } ** 0 >
< spare padding > ;
<GSM Neighbor Cell PBCCH Allocation params struct > ::=
        < NCELL_LIST_INDEX : bit (6) >
        { 0 | 1 < BSIC : bit (6) >}
        { 0 < SI13 PBCCH Location 1 : < SI13 PBCCH Location struct
        1 > >
        | 1
        { 0   < PBCCH Description : < PBCCH Description struct 2 >>
        | 1   < PBCCH Description : < PBCCH Description struct >> } ;
        }
< SI13 PBCCH Location struct 1 > ::=
    { 0   -- same PBCCH Allocation as former cell
    | 1    < PBCCH_LOCATION : bit (2) >
           < PSI1_REPEAT_PERIOD : bit (4) > } ;
< PBCCH Description struct > ::=
        < Pb : bit (4) >
        < TSC : bit (3) >
        < TN : bit (3) >
        { 0 -- default to BCCH carrier
        | 10 < ARFCN : bit (10) >
                        | 11 < MAIO : bit (6) > } ;
< PBCCH Description struct 2 > ::=
    < PSI1_REPEAT_PERIOD : bit (4) >
    < Pb : bit (4) >
    < TN : bit (3) >
    < PBCCH Frequency Description : < Frequency Parameters IE >> ;
```

In the above example message, it is assumed that the message is to be segmented over a number of messages. If this is not the case, some of the information in the start of the message can be removed.

A message like the above can be used in GPRS. It can be sent as PSI on PBCCH or on PACCH, and can be controlled through change a mark procedure if needed.

(As in case of Table 2, the coding in Table 3 is for illustration purposes; changes and/or optimizations might be needed due to coding style, removal of options, etc.)

As for adding the PBCCH allocation for PCCO and PCCC, only the allocation for one specific cell is needed because these messages are addressed to a specific mobile station for directing or helping the mobile station perform cell change to a specific cell. This means that only one PBCCH allocation must be added to these messages. In the following two coding examples (Tables 4 and 5) only one of the three PBCCH allocation description options is added. Table 4 illustrates how the PBCCH allocation description could be added to the PCCO message.

TABLE 4

PACKET CELL CHANGE ORDER message content

```
< Packet Cell Change Order message content > ::=
< PAGE_MODE : bit (2) >
   { { 0 < Global TFI : < Global TFI IE > >
     | 10 < TLLI / G-RNTI : bit (32) > }
     { 0
       { < IMMEDIATE_REL : bit >
         < GSM target cell: < GSM target cell struct >>
         ! < Non-distribution part error : bit (*) = < no string > > }
       | 1
       { 00 -- Message escape
         { < IMMEDIATE_REL : bit >
           { 0 | 1 < UTRAN FDD Target cell: < UTRAN FDD Target cell IE > }
           { 0 | 1 < UTRAN TDD Target cell: < UTRAN TDD Target cell IE > }
           { null | 0 bit ** = < no string > -- Receiver compatible with earlier release
           | 1 -- Additions in Rel-5 :
               { 0 | 1 < G-RNTI extension : bit (4) > }
               < padding bits > }
         ! < Non-distribution part error : bit (*) = < no string > > }
         ! < Message escape : { 01 | 10 | 11 } bit (*) = <no string> > } }
       ! < Address information part error : bit (*) = < no string > > }
     ! < Distribution part error : bit (*) = < no string > > ;
< GSM target cell struct > ::=
   < ARFCN : bit (10) >
   < BSIC : bit (6) >
   < NC Measurement Parameters : < NC Measurement Parameters struct > >
   { null | 0 bit ** = < no string > -- Receiver compatible with earlier release
   | 1 -- Additions in release 98 :
     { 0 | 1 < LSA Parameters : < LSA Parameters IE >> }
     { null | 0 bit ** = < no string > -- Receiver compatible with earlier release
     | 1      -- Additions in release 99 :
       < ENH Measurement parameters : < ENH Measurement parameters struct >>
       { null | 0 bit ** = < no string > -- Receiver compatible with earlier release
       | 1    -- Additions in release R4 :
         < CCN_ACTIVE : bit (1) >
         { 0 | 1 < CONTAINER_ID : bit (2) > }
         { 0 | 1 < CCN Support Description : < CCN Support Description struct >> }
         { null | 0 bit ** = < no string > -- Receiver compatible with earlier release
         | 1    -- Additions in Rel-5 :
           { 0 | 1 < G-RNTI extension : bit (4) > }
           { 0 | 1 < Iu Mode Neighbor Cell Parameters : { 1 < Iu Mode Neighbor Cell params struct > } ** 0 > }
               --Supplementary information for dual Iu mode and A/Gb mode capable cells
           { 0 | 1 < NC Iu MODE ONLY CAPABLE CELL LIST : NC Iu Mode Only Cell List struct > }
           { 0 | 1 < GPRS 3G Additional Measurement Parameters Description 2 :
               < GPRS 3G Additional Measurement Parameters Description 2 struct >>}
           { null | 0 bit ** = < no string > -- Receiver compatible with earlier release
           | 1    -- Additions in Rel-6 :
             < 3G_CCN_ACTIVE : bit (1) >
**BEGIN ADDED PART
             { 0 | 1 < PBCCH Description : < PBCCH Description struct 2 > }
**END ADDED PART
             < padding bits > } } } } ;
```

Note the added part at the end of the above illustrated coding (which is a shortened version of a complete message). It should be noticed that adding the PBCCH description to the PCCO message might lead to the fact that the message must be segmented, i.e. divided into more than one message. The invention also encompasses defining a new version of the PCCO message for the purpose of including the PBCCH description.

Table 5 provides an illustrative example of how the PBCCH allocation description could be added to the PCCC message.

TABLE 5

PACKET CELL CHANGE CONTINUE message content

```
< Packet Cell Change Continue message content > ::=
< PAGE_MODE : bit (2) >
{ 0 < GLOBAL_TFI : Global TFI IE >
```

TABLE 5-continued

PACKET CELL CHANGE CONTINUE message content

```
{ { 0 | 1 < ARFCN : bit (10) >
     < BSIC : bit (6) >
     < CONTAINER_ID : bit (2) >
**BEGIN ADDED PART
     { 0 | 1 < PBCCH Description : < PBCCH Description
         struct 2 > } }
**END ADDED PART
     < padding bits >
     ! < Non-distribution part error : bit (*) = < no string > > }
     ! < Address information part error : bit (*) = < no string > > }
   ! < Distribution part error : bit (*) = < no string > > ;
```

Again, the above tables are offered only for illustration purposes. More optimized coding might be possible.

Besides adding the PBCCH allocation in the PCCC message it is also necessary to make it possible to utilize the Network Assisted Cell Change (NACC) procedure, or parts of it, so that it may used also in broadcast/multicast receive mode. Currently it is only possible to use the Packet Cell Change Continue message as part of the NACC procedure. The invention includes using an improved format of the PCCC. The improved PCCC may be used either together with a full or simplified version of the NACC procedure or even without the actual NACC procedure. The NACC procedure is already specified and the only change needed for it to work with MBMS is to allow for it to be functional also in MBMS reception mode. It would then be possible for the mobile station to send the necessary Packet Cell Change Notification (PCCN) message if the mobile station has an allocated feedback channel available.

The network could also choose to use the information it receives through the measurement report or the proposed PCCN on the feedback channel directly to either send PCCC or PCCO to the mobile station. Each of these messages could include the PBCCH allocation information. In this situation the PCCC or PCCO message could be sent to the mobile station in a paging block that the network knows the mobile station is listening to (because the mobile station in broadcast/multicast receive mode listens to its paging channel), or the network could send the message on PACCH.

Using the proposed modified PCCO also requires changing the way the mobile station responds when receiving a PCCO (compared to the response specified in TS 3GPP 44.60 section 8.4.2). Such a change might not be needed if a new message similar to the existing PCCO-style is used.

Embodiments and illustrative implementations of the invention are described above assuming re-use of the existing PCCC and PCCO. The invention also encompasses new formats of the messages, or even a completely newly defined version of PCCO. Whatever the message structure that is used, though, the invention—at least for some embodiments—encompasses having the network include the possible PBCCH allocation description in a modified version (or completely new version) of the PCCO or PCCC. In particular, the invention encompasses having the mobile station use a feedback channel for notifying the network about a coming cell change and the network may then direct or help the mobile station using PCCO or PCCN to convey any possible PBCCH allocation of a potential target cell.

As for using the SI2n for distributing the neighbor cell PBCCH allocation description, this is a newly added message designed for informing mobile stations camped on BCCH in a cell about a neighboring cell's cell reselection parameters. It is possible also to add the PBCCH allocation description to the message. An illustrative coding of option is provided in Table 6.

TABLE 6

SI2n Rest Octets information element

```
< SI2n Rest Octets > ::=
    < BA_IND : bit (1) >
    < SI2n_CHANGE_MARK: bit (2) >
    < SI2n_INDEX : bit (4) >
    < SI2n_COUNT : bit (4) >
    < GSM Neighbor Cell Selection parameters : { 1 < GSM Neighbor Cell Selection params struct > } ** 0 >
< spare padding > ;
< GSM Neighbor Cell Selection params struct > ::=
    < NCELL_LIST_INDEX : bit (6) >
    { 0 | 1    < BSIC : bit (6) > }
    { 0 | 1
    < CELL_BAR_ACCESS : bit (1) >
        < SAME_LA_AS_SERVING_CELL : bit (1) >
        { 0 | 1    < RXLEV_ACCESS_MIN : bit (6) >
                   < MS_TXPWR_MAX_CCH : bit (5) > }
        { 0 | 1    < CBQ : bit (1) >
                   < CELL_RESELECT_OFFSET : bit (5) >
                   < TEMPORARY_OFFSET : bit (3) >
                   < PENALTY_TIME : bit (5) > }
        { 0 | 1    < POWER_OFFSET : bit (2) > }
        { 0 | 1    < GPRS Support Indicator : < GPRS Support Indicator struct > > }
    } ;
<GPRS Support Indicator struct> ::=
    { 0             -- GPRS not supported in the cell
    | 1             -- GPRS supported in the cell
        < SAME_RA_AS_SERVING_CELL : bit (1) >
        < SI13_POSITION : bit (1) >
**BEGIN ADDED PART
        { 0 < SI13 PBCCH Location 1 : < SI13 PBCCH Location struct 1 > >
        | 1
            { 0    < PBCCH Description : < PBCCH Description struct 2 >>
            | 1 < PBCCH Description : < PBCCH Description struct >> } ;
**END ADDED PART
    } ;
```

In the same style as adding the PBCCH allocation information in the above SI2n message, it is also possible to add the PBCCH allocation to PSI3(bis) messages defined in PBCCH. These messages are used for distributing neighbor cell information to mobile stations camped on packet channels.

It is possible also to create a totally new system information (SI) or packet system information (PSI) message for the purpose of delivering the PBCCH allocation for neighbors from the network to a mobile station. This option is similar to the option concerning nPSIx given above (and illustrated in Table 3). The message may be defined for distribution on BCCH, PBCCH or PACCH.

The invention has been described above in terms primarily of the communication of information from an element of a wireless communication system to a mobile station, i.e. as steps of a method of operation, and in particular operation in connection with cell change. The invention also comprehends corresponding equipment, i.e. an apparatus for performing the above described steps. Thus, for each step described above, there can be a corresponding module of the corresponding apparatus, although it is also possible for the functionality for performing more than one of the above-described steps to be incorporated into a single module. Such modules may be implemented as hardware, or may be implemented as software or firmware for execution by a processor. In particular, in the case of firmware or software, the invention is provided as a computer program product including a computer readable storage structure embodying computer program code with instructions corresponding to the described method—i.e. the software or firmware—thereon for execution by a computer processor.

It should also be pointed out that although the invention is described above primarily in terms of a mobile station receiving signals from a cellular communication system, in order to receive a particular signal, which is to be understood as including processing of the signal so as to interpret the signal, the mobile station must be appropriately configured or programmed or provided with appropriate application specific integrated circuits. Only with functionality provided by such special features can the mobile station interpret and make use of information it receives as signals. Thus, a step of receiving a signal is indicative of processing by the mobile station, which is indicative of a corresponding functionality and so a corresponding structure (encompassing software).

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method, comprising:
receiving at a mobile station, prior to a cell change from a current cell to a new cell in a cellular communication system, a signal on a control channel of the current cell conveying a message including neighboring cell information, wherein said message indicates bearer information for receiving a point-to-multipoint data channel in the new cell;
also receiving at the mobile station prior to the cell change a signal of the current cell indicating bearer information for receiving a system information channel in the new cell, wherein the system information channel is a packet broadcast control channel for broadcasting packet data specific packet system information; and
beginning to receive at the mobile station, after the cell change, both the system information channel and also the point-to-multipoint data channel without obtaining bearer information for either after the cell change.

2. The method as in claim 1, wherein the system information channel is coordinated with the point-to-multipoint data channel, wherein after the cell change the mobile station receives the data on the point-to-multipoint data channel immediately and without interruption while changing the cell.

3. The method as in claim 1, wherein the bearer information for receiving the system information channel in the new cell is included in the message including the neighboring cell information.

4. The method as in claim 1, wherein the bearer information for receiving the system information channel in the new cell is included in a different message than the message including the neighboring cell information.

5. The method as in claim 1, wherein the neighboring cell information is provided as a broadcast signal.

6. The method as in claim 1, wherein the neighboring cell information is provided as a point-to-point signal from a sender to the mobile station.

7. The method as in claim 1, wherein the system information channel is either a hopping channel or a non-hopping channel.

8. The method as in claim 1, wherein the point-to-multipoint data channel is a packet data channel, and wherein the system information channel is a packet broadcast control channel, and the neighboring cell information includes the bearer information for the system information channel as a description structure message element.

9. The method as in claim 1, wherein the point-to-multipoint data channel is a packet data channel, and wherein the system information channel is a packet broadcast control channel, and the neighboring cell information includes the bearer information for the system information channel as a system information location structure message element.

10. The method as in claim 1, wherein the point-to-multipoint data channel is a packet data channel, and wherein the system information channel is a packet broadcast control channel, and the neighboring cell information is communicated over a packet associated control channel.

11. The method as in claim 1, wherein the point-to-multipoint data channel is a packet data channel, and wherein the system information channel is a packet broadcast control channel, and the neighboring cell information is received over a broadcast channel.

12. A computer program product comprising a computer readable storage structure embodying computer program code thereon for execution by a computer processor, wherein said computer program code comprises instructions for performing the method of claim 1.

13. A device, comprising:
means for receiving, prior to a cell change from a current cell to a new cell in a cellular communication system, a signal on a control channel of the current cell conveying a message including neighboring cell information, wherein said message indicates bearer information for receiving a point-to-multipoint data channel in the new cell;
means for also receiving, prior to the cell change, a signal of the current cell indicating bearer information for receiving a system information channel in the new cell, wherein the system information channel is a packet broadcast control channel for broadcasting packet data specific packet system information; and
means for beginning to receive, after the cell change, both the system information channel and also the point-to-multipoint data channel without obtaining bearer information for either after the cell change.

14. The device as in claim 13, wherein the point-to-multipoint data channel is a packet data channel, and wherein the system information channel is a packet broadcast control channel, and the neighboring cell information includes the bearer information for the system information channel as a description structure message element.

15. The device as in claim 13, wherein the point-to-multipoint data channel is a packet data channel, and wherein the system information channel is a packet broadcast control channel, and the neighboring cell information includes the bearer information for the system information channel as a system information location structure message element.

16. The device as in claim 13, wherein the point-to-multipoint data channel is a packet data channel, and wherein the system information channel is a packet broadcast control channel, and the neighboring cell information is communicated over a packet associated control channel.

17. The device as in claim 13, wherein the point-to-multipoint data channel is a packet data channel, and wherein the system information channel is a packet broadcast control channel, and the neighboring cell information is received over a broadcast channel.

18. The device of claim 13, wherein the device is a chip.

19. A mobile station including the device as in claim 13.

20. A system, comprising the mobile station as in claim 19, and a radio access network including a transceiver for wirelessly communicatively coupling to the mobile station, and for providing the signal on the control channel conveying a message including the neighboring cell information indicating bearer information for receiving the point-to-multipoint data channel in the new cell, and also for providing the signal indicating the bearer information for receiving the system information channel in the new cell.

21. A network element for wireless communication in a current cell of a cellular communication system, comprising:
means for providing, over a control channel of the current cell a signal conveying a message including neighboring cell information, wherein said message indicates bearer information for a mobile station to receive a point-to-multipoint data channel in a new cell, and
means for also providing a signal for the current cell indicating bearer information for the mobile station to receive system information channel in the new cell, wherein the system information channel is a packet broadcast control channel for broadcasting packet data specific packet system information,
wherein the signals are provided prior to the mobile station changing from the current cell to the new cell.

22. The network element as in claim 21, wherein the system information channel is coordinated with the point-to-multipoint data channel, wherein after the cell change the mobile station receives the data on the point-to-multipoint data channel immediately and without interruption while changing the cell.

23. The network element as in claim 21, wherein the bearer information for receiving the system information channel in the new cell is included in the message including the neighboring cell information.

24. A device, comprising a processor configured to:
receive, prior to a cell change from a current cell to a new cell in a cellular communication system, a signal on a control channel of the current cell conveying a message including neighboring cell information, wherein said message indicates bearer information for receiving a point-to-multipoint data channel in the new cell;
also receive, prior to the cell change, a signal from the current cell bearer information for receiving a system information channel in the new cell, wherein the system information channel is a packet broadcast control channel for broadcasting packet data specific packet system information; and
begin receiving, after the cell change, both the system information channel and also the point-to-multipoint data channel without obtaining bearer information for either after the cell change.

25. The device as in claim 24, wherein the point-to-multipoint data channel is a packet data channel, and wherein the system information channel is a packet broadcast control channel, and the neighboring cell information includes the bearer information for the system information channel as a description structure message element.

26. A computer program product comprising a computer readable storage structure embodying computer program code thereon for execution by a computer processor of a mobile station, wherein said computer program code comprises instructions for:
receiving at the mobile station, prior to a cell change from a current cell to a new cell in a cellular communication system, a signal on a control channel of the current cell conveying a message including neighboring cell information, wherein said message indicates bearer information for receiving a point-to-multipoint data channel in the new cell;
also receiving at the mobile station prior to the cell change a signal of the current cell indicating bearer information for receiving a system information channel in the new cell, wherein the system information channel is a packet broadcast control channel for broadcasting packet data specific packet system information; and
beginning to receive at the mobile station, after the cell change, both the system information channel and also the point-to-multipoint data channel without obtaining bearer information for either after the cell change.

27. The computer program as in claim 26, wherein the system information channel is coordinated with the point-to-multipoint data channel, wherein after the cell change the mobile station receives the data on the point-to-multipoint data channel immediately and without interruption while changing the cell.

* * * * *